US012392187B2

(12) United States Patent
Hegwein

(10) Patent No.: US 12,392,187 B2
(45) Date of Patent: Aug. 19, 2025

(54) ACTUATING APPARATUS FOR OPENING AND CLOSING A COVER IN OR ON A VEHICLE

(71) Applicant: ILLINOIS TOOL WORKS INC., Glenview, IL (US)

(72) Inventor: Matthias Hegwein, Ippesheim (DE)

(73) Assignee: Illinois Tool Works, Inc., Glenview, IL (US)

( * ) Notice: Subject to any disclaimer, the term of this patent is extended or adjusted under 35 U.S.C. 154(b) by 286 days.

(21) Appl. No.: 17/746,602

(22) Filed: May 17, 2022

(65) Prior Publication Data

US 2022/0372809 A1 Nov. 24, 2022

(30) Foreign Application Priority Data

May 21, 2021 (DE) ..................... 10 2021 113 334.3

(51) Int. Cl.

*E05B 83/34* (2014.01)
*E05B 81/06* (2014.01)
*E05F 1/10* (2006.01)
*E05F 3/10* (2006.01)
(Continued)

(52) U.S. Cl.

CPC ................ *E05F 1/10* (2013.01); *E05B 81/06* (2013.01); *E05B 83/34* (2013.01); *E05F 1/1091* (2013.01); *E05F 3/10* (2013.01); *E05B 17/0037* (2013.01); *E05B 81/18* (2013.01); *E05Y 2201/21* (2013.01); *E05Y 2201/246* (2013.01); *E05Y 2201/264* (2013.01); *E05Y 2201/474* (2013.01); *E05Y 2900/534* (2013.01)

(58) Field of Classification Search

CPC .......... E05B 81/20; E05B 83/28; E05B 83/34; E05F 1/08; E05F 1/10; E05F 1/105; Y10T 292/0969; E05C 19/028
See application file for complete search history.

(56) References Cited

U.S. PATENT DOCUMENTS 1,947,524 A * 2/1934 Horldt ....................... E05F 7/04 16/86 A
2,439,057 A 4/1948 Russell
4,693,454 A 9/1987 Tsuchiya
(Continued)

FOREIGN PATENT DOCUMENTS

DE 3939118 A1 5/1991
DE 19642457 A1 * 10/1997 ............. E05B 81/20
(Continued)

*Primary Examiner* — Carlos Lugo
(74) *Attorney, Agent, or Firm* — THOMPSON HINE LLP

(57) ABSTRACT

An actuating apparatus (1) for opening and closing a cover in or on a vehicle, having a locking and/or arresting kinematics that cooperate with the cover. The actuating apparatus includes a housing (2) and an actuating part (3) received in the housing (2) and movably supported relative to the housing (2). The actuating part (3) cooperates with the cover in such a way that the actuating part (3) performs a movement relative to the housing (2) between a first position and a second position upon a movement of the cover between a closed position and an open position, wherein, in the first position, the actuating part (3) is in a locked state. The actuating apparatus (1) further includes an elastically deformable spring system (4) associated with the actuating part (3), in particular having a progressive spring characteristic.

9 Claims, 4 Drawing Sheets

(51) Int. Cl.

| | |
|---|---|
| *E05B 17/00* | (2006.01) |
| *E05B 81/18* | (2014.01) |

(56) References Cited

U.S. PATENT DOCUMENTS

| | | | | |
|---|---|---|---|---|
| 7,841,632 | B2 * | 11/2010 | Tracy | F16F 15/08 292/121 |
| 8,845,001 | B2 * | 9/2014 | Kotama | E05C 19/022 296/97.22 |
| 9,223,355 | B2 * | 12/2015 | Kim | G06F 1/1679 |
| 9,950,615 | B2 * | 4/2018 | Horikawa | B60K 15/05 |
| 10,633,893 | B2 * | 4/2020 | Harajli | E05B 81/20 |
| 10,882,394 | B2 * | 1/2021 | Husberg | E05B 81/20 |
| 11,332,963 | B2 * | 5/2022 | Karlein | E05B 85/103 |
| 2014/0042768 | A1 | 2/2014 | Watanabe | |
| 2014/0084599 | A1 | 3/2014 | Beck | |
| 2015/0090713 | A1 | 4/2015 | Betzen | |
| 2016/0326780 | A1 | 11/2016 | Watanabe | |
| 2020/0207203 | A1 | 7/2020 | Werner | |

FOREIGN PATENT DOCUMENTS

| | | | | |
|---|---|---|---|---|
| DE | 10212783 | A1 | 11/2003 | |
| DE | 10248420 | A1 | 4/2004 | |
| DE | 102008032758 | A1 | 1/2010 | |
| DE | 102008057933 | B4 | 7/2010 | |
| DE | 102009060119 | A1 | 6/2011 | |
| DE | 102013016455 | A1 | 4/2015 | |
| DE | 102014014909 | A1 * | 4/2015 | E05B 15/04 |
| DE | 102017107157 | A1 * | 10/2018 | |
| DE | 102017116230 | A1 | 1/2019 | |
| DE | 102018123949 | A1 | 3/2019 | |
| EP | 1293632 | A2 | 3/2003 | |
| EP | 3789226 | A1 * | 3/2021 | B60J 5/047 |
| FR | 2656032 | A1 * | 6/1991 | |
| KR | 20090088036 | A * | 8/2009 | |

* cited by examiner

ACTUATING APPARATUS FOR OPENING AND CLOSING A COVER IN OR ON A VEHICLE

TECHNICAL FIELD

The present invention relates to an actuating apparatus for opening and closing a cover in or on a vehicle, having a locking and/or arresting kinematics that cooperate with the cover.

BACKGROUND

Such actuating apparatuses are known, at least in principle, for example from publication DE 10 2008 057 933 B4 or publication DE 10 2009 060 119 A1.

For example, in the actuating apparatus known from the publication DE 10 2009 060 119 A1, the locking and/or arresting kinematics are combined with a simultaneous rotational movement of the tappet. This is achieved by at least one helical groove of the tappet and the engagement of at least one projection on the inner circumference of a housing of the actuating apparatus into the groove. The known actuating apparatus is characterized by a small number of components and thus a robust and cost-efficient construction. At the same time, it reliably ensures the required locking and unlocking, for example of a tank flap or charging flap, at all times. In addition, it can be combined with a central locking function.

The known actuating apparatuses of the aforementioned type generally comprise an axially movable tappet, on the outer circumference of which a control curve is provided for implementing the locking and/or arresting kinematics. In operation, the cover, such as a tank flap, cooperates with the actuating end of the actuating apparatus projecting from the well.

In particular, in the closed state, the cover rests on the actuating end with its inner side. Due to the locking and/or arresting kinematics, the actuating apparatus may be brought into an unlocking position by pushing the cover towards the car body into an unlocking position, in which the actuating end projects further from the tank well and lifts the cover slightly from the body surface. The cover can then be, for example, manually grasped and fully pivoted open. When the cover is subsequently closed and a force applied to the actuating end of the actuating apparatus in this case, it is brought back into a locking and/or arresting position.

A disadvantage of actuating apparatuses having a locking and/or arresting kinematics is that the cover may inadvertently unlock and then transition into its open position. This is because it cannot be avoided that forces act on the cover not only during operation of the vehicle, but also during assembly. One example of this is washing systems, where, in particular during drying, a force exertion can occur on the cover, as a result of which the cover is brought into its unlocking position and then the cover undesirably transitions into its open position.

SUMMARY

The invention is thus based on assuring that an unintended opening of the cover is safely avoided.

Based on this situation, the problem addressed by the invention is therefore to specify an actuating apparatus of the above-mentioned type, in which an unintended opening of the cover can be safely avoided without reducing the operating comfort in an easy-to-implement but nevertheless effective manner.

The invention is in particular characterized in that, instead of a biasing spring having a linear spring characteristic, the actuating apparatus employs an elastically deformable spring system having a progressive or stepped spring characteristic, so that a sufficiently high biasing force must be overcome in order to transfer the cover into its release position, which safely prevents unintentional release of the cover.

In particular, the invention comprises an actuating apparatus for opening and closing a cover, for example a tank flap or charging flap, in or on a vehicle having a locking and/or arresting kinematics that cooperates with the cover.

In particular, the actuating apparatus comprises a housing, which is suitable for being installed in a vehicle. Furthermore, the actuating apparatus comprises an actuating part, in particular in the form of a tappet, wherein the actuating part is received at least in regions in the housing and is supported in a rotationally and/or translationally movable manner relative to the housing. The actuating part cooperates with the cover and is in particular connected or connectable to the cover in such a way that, upon a movement of the cover between a closed position of the cover and an open position of the cover, the actuating part performs a movement relative to the housing between a first position and a second position. In the first position of the actuating part, it is in a locked or arrested state.

The actuating apparatus further comprises an elastically deformable spring system associated with the actuating part for biasing the actuating part towards the second position of the actuating part.

In the actuating apparatus according to the invention, it is provided in particular that the locking and/or arresting kinematics are configured in such a way that a lifting of the locking or arresting of the actuating part, for example by means of a sensor and an actuator communicating with the sensor, is initiated or that the locking or arresting of the actuating part is lifted or can be lifted when the actuating part is moved relative to the housing further into the housing to a third position, starting from the first position of the actuating part.

Various embodiments can be considered for locking and/or arresting kinematics. Briefly summarized, in the locked or arrested position of the locking and/or arresting kinematics, the cover is closed. If the locking or arresting of the cover is released, a pressure on the cover can pivot it partially outwardly, namely by unlocking the actuating part of the locking and/or arresting kinematics. The elastically deformable spring system that is present in the locking and/or arresting kinematics then pushes the actuating part and thus the cover outwardly by a certain angle, in such a way that the cover can, for example, be grasped by hand and fully pivoted.

In conceivable designs, the locking and/or arresting kinematics use a so-called control wire that cooperates with a heart curve.

However, in order to reduce the number of components of the locking and/or arresting kinematics, it is advantageous that the locking and/or arresting kinematics comprises a ring surrounding the actuating part, which is axially fixed and rotatably supported in the housing. Preferably, there is further provided at least one parallel axis groove on the outside of the actuating part and at least one projection on the inner circumference of the ring, which engages with the groove via a wide adjustment range of the actuating part, whereby the ring maintains its rotational position in the region of the groove when the actuating part is moved axially.

In this embodiment of the locking and/or arresting kinematics, a first deflection surface running obliquely to the axis of the actuating part is preferably further used on the actuating part between the groove and the actuating end of the actuating part, which deflection surface cooperates with the projection of the ring and rotates the ring by a predetermined angular amount when the actuating part is moved into the housing with a predetermined first stroke.

In order to lock or arrest the actuating part in the first position corresponding to the closed position of the cover, the actuating part preferably comprises a recess facing the actuating end at a circumferential distance from the first [deflection] surface, which receives the projection when the actuating part is released after the first stroke, thereby locking the actuating part in a locked position after a return stroke in the housing.

In addition, it is conceivable that a second deflection surface running obliquely to the axis of the actuating part is provided on the actuating part between the locking recess and the actuating end, which cooperates with the projection when the actuating part is pushed further into the housing from the locking position with a second stroke, whereby the ring is rotated by a further angular sum, and the projection is aligned with the groove, and the actuating part is movable into its first extended position.

An alternative locking and/or arresting kinematics is known from publication DE 10 2018 123 949 A1, for example.

In order to ensure that, starting from the closed position of the cover and thus starting from the first (locked or arrested) position of the actuating part, the actuating part is forcibly unlocked and the cover transitions into its open position, not only one (single) spring with a linear spring characteristic is used as an elastically deformable spring system in the actuating apparatus according to the invention, as is the case in the actuating apparatuses and locking and/or arresting kinematics described above. Rather, in the actuating apparatus according to the invention, the elastically deformable spring system is configured in order to bias the actuating part with a first biasing force or a first biasing force range towards the second position of the actuating part when the actuating part is located between the first and second positions and to bias the actuating part with a second biasing force or a second biasing force range towards the second position of the actuating part when the actuating part is located between the first and third positions.

In particular, it is conceivable in this context that the first biasing force or the first biasing force range of the biasing system is different from the second biasing force or the second biasing force range.

Preferably, the first biasing force or the first biasing force range of the biasing system is less than the second biasing force or the second biasing force range.

The advantages achievable with the solution according to the invention are obvious: by using an elastically deformable spring system according to the invention, with which the actuating part is biased towards the second position of the actuating part, as a function of the position of the actuating part, the event sequence for unlocking and opening the cover is individually adaptable to the respective application.

It is thus in particular achievable that only a relatively low biasing force is applied to the cover or the actuating part in the direction of the second position of the actuating part when the actuating part is located between the first and second positions. In other words, in order to transition the cover from the open position to the closed position, only a relatively low biasing force needs to be overcome. This allows a particularly user-friendly handling when opening and closing the cover.

Moreover, this configuration has the advantage that, with an opening and closing of the cover effected by an actuator, in particular an electromotive actuator, only a relatively low force must be applied in order to manipulate the cover, i.e., in particular to transition from the open position to the closed position. This in turn allows the use of actuators that are small in size.

On the other hand, the elastically deformable spring system according to the invention offers the decisive advantage that the biasing force acting on the actuating part when the actuating part is located between the first and third position is selected or adjusted to be relatively high. In this way, it is thus ensured that the actuating part and thus the cover can only be transferred from the closed and locked/arrested position to the unlocked/released position when a significant force is applied to the cover or the actuating part. An unintended unlocking/release of the cover, for example in a washing line, can thus be prevented in a simpler yet more effective manner.

Advantageously, the first biasing force of the elastically deformable spring system and/or the second biasing force of the elastically deformable spring system is/are pre-determinable and in particular adjustable. Thus, the response behavior of the actuating apparatus and thus an event sequence for unlocking/release, opening, closing, and locking/arresting the cover can be individually adapted to the respective application.

In an easily realized but nevertheless effective manner, as the elastically deformable spring system, an elastically deformable spring system having a preferably progressive spring characteristic is used in such a way that, with an increase in the compression of the elastically deformable spring system, the biasing force acting upon the actuating part increases towards the second position of the actuating part.

For example, a progressive spring characteristic of the elastically deformable spring system can be achieved in that the elastically deformable spring system comprises at least one spring, in particular a metal spring, of a conical or barrel-shaped design.

Alternatively or additionally, the elastically deformable spring system can comprise a mixing circuit of a plurality of single springs, wherein, in the mixing circuit, the single springs are arranged in parallel and/or connected in series and/or interspersed. Alternatively or additionally, the single springs can be combined in the mixing circuit in such a way that the mixing circuit has a combined spring characteristic.

According to other implementations of the actuating apparatus according to the invention, an air or nitrogen spring is used as an elastically deformable spring system, which also preferably has a progressive spring characteristic.

According to implementations of the actuating apparatus according to the invention, the elastically deformable spring system comprises a first spring system having at least a first spring element and a second spring system having at least a second spring element. The first spring system is formed with the at least one first spring element and is configured in order to bias the actuating part with a (first) biasing force towards the second position of the actuating part when the actuating part is located between the first and second positions or when the actuating part is located between the second and third positions.

By contrast, in this embodiment, the second spring system is configured with the at least one second spring element and is arranged in order to bias the actuating part with a (second) biasing force towards the second position of the actuating part only when the actuating part is located between the second and third positions. In particular, the second spring system with the at least one second spring element does not exert a biasing force on the actuating part towards the second position of the actuating part when the actuating part is located between the first and second positions.

Thus, in this embodiment, a mixing circuit of the first and second spring elements of the first and second spring systems is used.

In this context, it is advantageously provided that the second spring system is formed with the at least one second spring and is received or integrated in the housing in such a way that the at least one second spring of the second spring system is only compressed with the actuating part or by the actuating part or is compressible when the actuating part is located in its first position or between the first and third positions.

Alternatively, however, it is also conceivable that the second spring system comprises, as the at least one second spring element, a spring-elastic component and in particular a component made of a spring-elastic elastomer, wherein this component is preferably arranged outside the housing and configured in order to come into contact with the cover only when the actuating part is located in its first position or between the first and third positions.

According to alternative embodiments of the actuating apparatus, it comprises a damper or spring device, in particular encapsulated at least in regions. This damper or spring device, which is in particular encapsulated at least in regions, can be in the form of a single pipe damper or a dual pipe damper, for example, or in the form of a cylinder-piston arrangement, wherein however other embodiments of the damper or spring device are also conceivable.

In particular, the damper or spring device used in the embodiment of the actuating apparatus employs a first force transfer element, which faces towards the second position of the actuating part, and a second force transfer element axially spaced apart therefrom, wherein the first force transfer element is movable relative to and towards the second force transfer element by overcoming a biasing force.

In particular, it is provided in this embodiment that the elastically deformable spring system comprises a spring system for axially biasing the damper or spring device and in particular the second force transfer element of the damper or spring device towards the second position of the actuating part. Further, the damper or spring device can be moved axially relative to the housing, at least over a predetermined or determinable stroke range.

In this embodiment, the actuating part of the actuating apparatus is in particular formed by the first force transfer element of the damper or spring device.

In this context, it can be appreciated that a stop is provided, which is preferably configured in the housing, wherein the stop is configured in order to restrict a stroke of movement of the damper or spring device into the housing. In particular, the stop is configured in order to block a movement of the second force transfer element of the damper or spring device further into the housing when the actuating part (i.e., the first force transfer element) is present in its first position.

Here, a spring stiffness of the damper or spring device should preferably be stronger than a spring stiffness of the spring system of the elastically deformable spring system. In this design variant of the actuating apparatus according to the invention, it is also suggested that the damper or spring device be configured as a fluid damper, in particular in the form of an air, nitrogen, or oil damper.

According to further developments of the actuating apparatus according to the invention, it is provided that the actuating apparatus further comprises an actuator, in particular an electromotive actuator, for the as-needed movement of the cover between the closed position and the open position after unlocking of the actuating part.

Furthermore, for implementing an autonomous opening or closing of the cover, it is appreciated that the actuating apparatus comprises sensors for detecting the first, second, and/or third position of the actuating part.

The invention also relates to a cover of a vehicle, comprising an actuating apparatus according to the invention. The cover can be a tank flap and/or charging flap. Accordingly, the invention also relates to a tank flap and/or charging flap arrangement having an actuating apparatus according to the invention.

BRIEF DESCRIPTION OF THE DRAWINGS

Exemplary embodiments of the actuating apparatus according to the invention are described in further detail below, with reference to the accompanying drawings.

The figures show.

DETAILED DESCRIPTION

A first exemplary embodiment of the actuating apparatus 1 according to the invention will first be described with reference to the drawings in FIG. 1 to FIG. 4.

The actuating apparatus 1 comprises a housing 2 having an approximately cylindrical, axial cavity in which an actuating part 3, in particular in the form of a tappet, is receivable. In the cavity, there is furthermore an elastically deformable spring system 4 in the form of a coil spring with a progressive spring characteristic, which supports itself on an abutment at its lower end. At its upper end, it surrounds a peg of the actuating part 3, which is in particular configured as a tappet, at the lower end.

Figure 1:
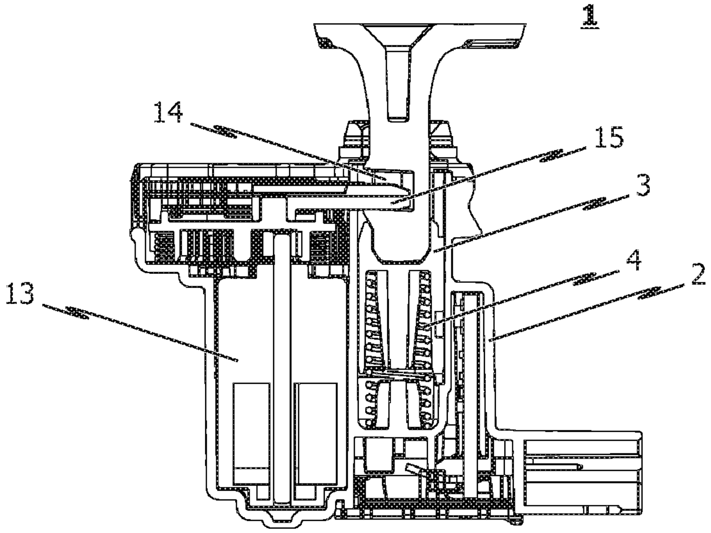
FIG. 1 schematically and in a cut view, a first exemplary embodiment of the actuating apparatus according to the invention, wherein the actuating part or the cover is in the closed and locked/arrested position (=first position of the actuating part)
Figure 2:
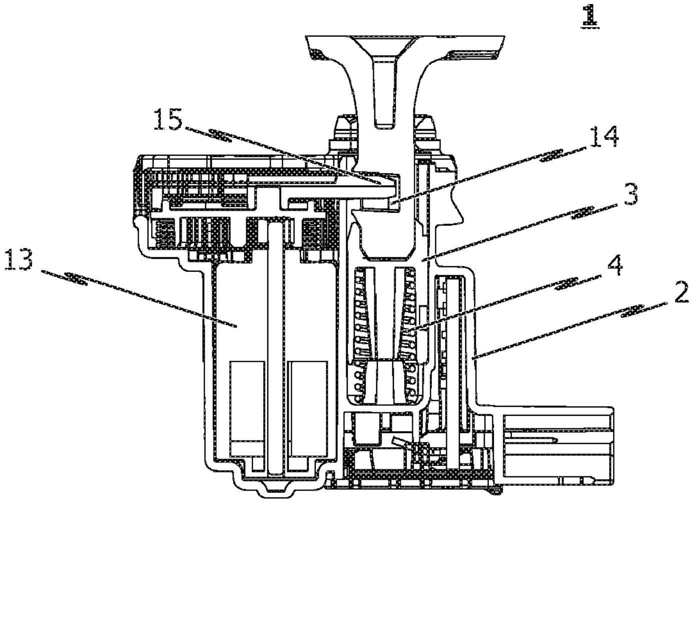
FIG. 2 schematically and in a cut view, the first exemplary embodiment of the actuating apparatus according to the invention according to FIG. 1, but in a state in which the cover and the actuating part are in the compressed state for unlocking the actuating part (=third position of the actuating part)
Figure 3:
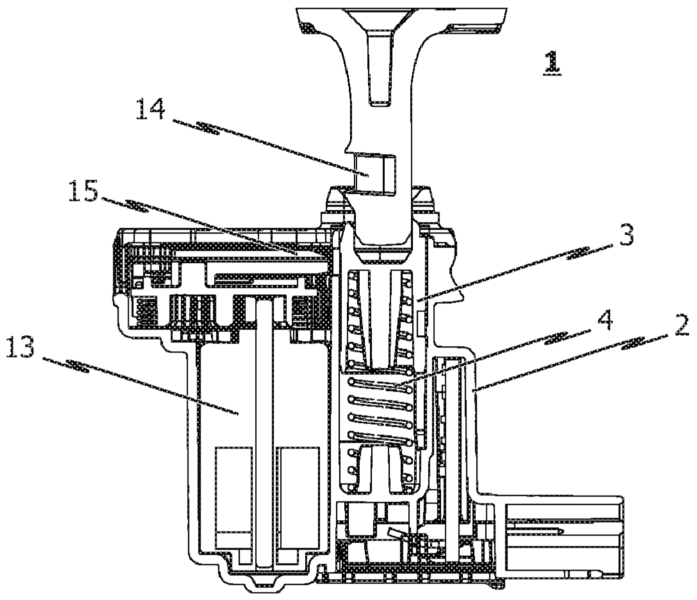
FIG. 3 schematically and in a cut view, the first exemplary embodiment of the actuating apparatus according to the invention, but in a state in which the cover and the actuating part are each in the open state (=second position of the actuating part)

Depending on its position in FIG. 1 to FIG. 3, the actuating part 3 extends to varying lengths into the housing 2.

In the illustration of FIG. 1, the actuating part 3 is in its first locked/arrested position, and the cover cooperating with the actuating part 3 (not shown in the drawings) is in its closed position.

If the actuating part 3 is pushed from its first locked/arrested position according to FIG. 1 by pressure from above further downwards into the housing 2, the spring of the elastically deformable spring system 4 is further compressed, and the actuating part 3 as well as the corresponding locking and/or arresting kinematics are transferred in the compressed and actuated state as shown in FIG. 2. In the third position of the actuating part 3 shown in FIG. 2, this is in the unlocked state.

Then, due to the biasing force acting on the actuating part 3 by the elastically deformable spring system 4, the actuating part 3 together with the cover is transferred into the open position shown in FIG. 3, in which the actuating part 3 is present in its second position.

In FIG. 1 to FIG. 3, a blocking recess 14 can be seen on the outside of the actuating part 3. In this blocking recess 14, a blocking latch 15 can engage in order to block the actuating part 3 and thus to block the cover in a locked/arrested position of the actuating part 3 in the housing 2.

An electric motor 13 is used for this purpose, which is also preferably received in the housing 2 and cooperates with the blocking latch 15, for example via a gear, and can thus adjust the latter in its direction extending perpendicular to the longitudinal axis of the actuating part 3 between a blocking position that engages with the blocking recess 14 and a release position that is retracted from the blocking recess 14.

A gear rack can also be provided for manual release, wherein, for example, a pulling force can be applied to the rack via a bowden pull (not shown in more detail in the drawings), whereby the blocking latch 15 can be pulled out of the blocking recess 14, for example in the event of a failure of the electric motor 13 or in the event of a failure of the electrical supply.

Figure 4:
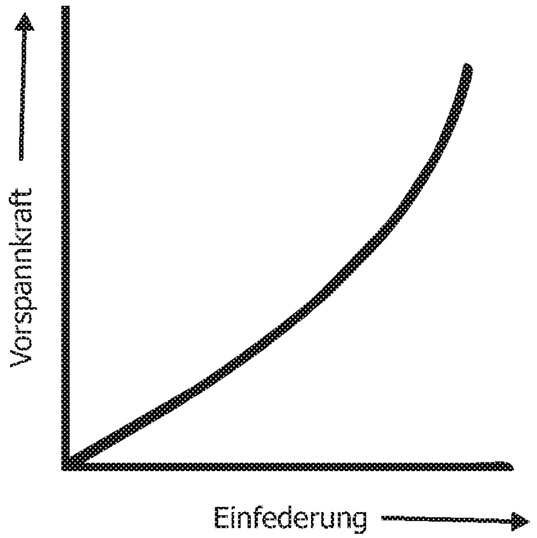
FIG. 4 schematically, the spring characteristic of the elastically deformable spring system used in the first exemplary embodiment of the actuating apparatus.

As already indicated, in the actuating apparatus 1 shown in FIG. 1 to FIG. 3, for biasing the actuating part 3 to its second position shown in FIG. 3, an elastically deformable spring system 4 with a progressive spring characteristic is used. FIG. 4 schematically shows the characteristic curve of the elastically deformable spring system 4 used in the first exemplary embodiment of the actuating apparatus 1.

Although in FIG. 1 to FIG. 3, the spring associated with the elastically deformable spring system 4 has a cylindrical design, due to the material property (not shown in the drawings), it has an overall progressive spring characteristic shown by way of example in FIG. 4. According to this progressive spring characteristic, as the compression increases, the biasing force is increased, which acts on the actuating part 3.

Instead of a spring having a cylindrical design and different materials, a spring, for example with a conical spring design or with a mixing circuit of single springs, can also be used as an elastically deformable spring system 4.

Embodiments of the actuating apparatus 1 according to the invention, in which mixing circuits of single springs are used as the elastically deformable spring system 4 in order to achieve a progressive spring characteristic, are described below with reference to the drawings in FIGS. 5 to 7 and 8 to 10.

A further (second) exemplary embodiment of the actuating apparatus 1 according to the invention is first described in the following with reference to the drawings in FIG. 5 to FIG. 7.

The actuating apparatus 1 comprises a housing 2, which is suitable for being installed in a vehicle.

Moreover, the actuating apparatus 1 comprises an actuating part 3, which is received at least in regions in the housing 2 and movably supported axially relative to the housing 2, wherein the actuating part 3 cooperates with the cover and in particular is connected or connectable to a cover (not shown) in such a way that the actuating part 3 performs a movement relative to the housing 2 between a first position and a second position upon a movement of the cover in the axial direction between a closed position and an open position, wherein, in the first position, the actuating part 3 is in a locked/arrested state.

Figure 5:
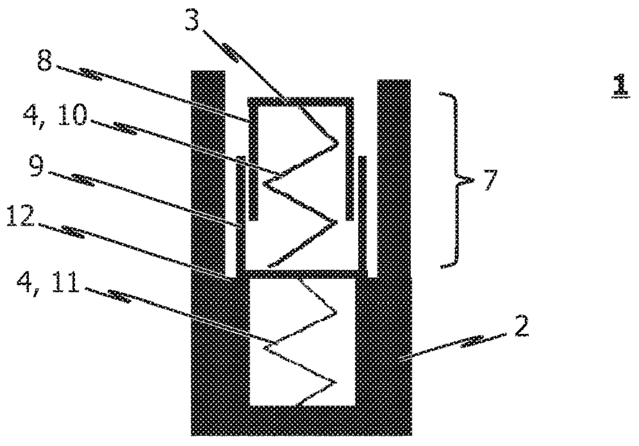
FIG. 5 schematically and in a cut view, a second exemplary embodiment of the actuating apparatus according to the invention, wherein the actuating part is in the closed and locked/arrested position (=first position of the actuating part)

Specifically, FIG. 5 shows a state of the actuating apparatus 1 in which the actuating part 3 is in the first position, which corresponds to a closed position of the cover.

Figure 7:
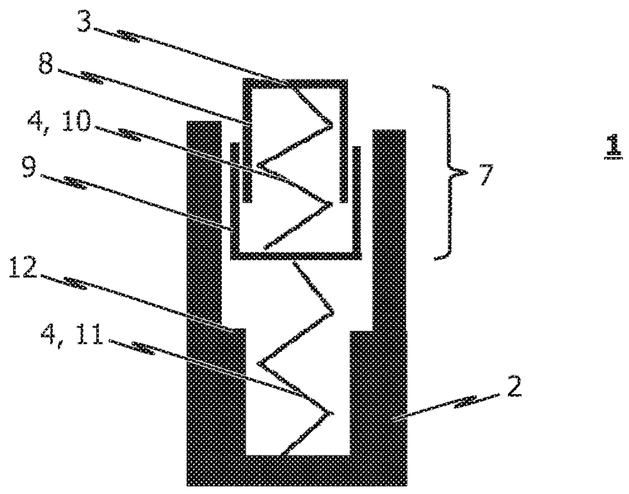
FIG. 7 schematically and in a cut view, the second exemplary embodiment of the actuating apparatus according to the invention, but in a state in which the actuating part is in the open state (=second position of the actuating part)

By contrast, in FIG. 7, the actuating apparatus 1 is shown in a state in which the actuating part 3 is in its second position, which corresponds to the open position of the cover.

The (first) position of the actuating part 3 shown in FIG. 5 corresponds in particular to a locked/arrested position of the actuating part 3.

Figure 6:
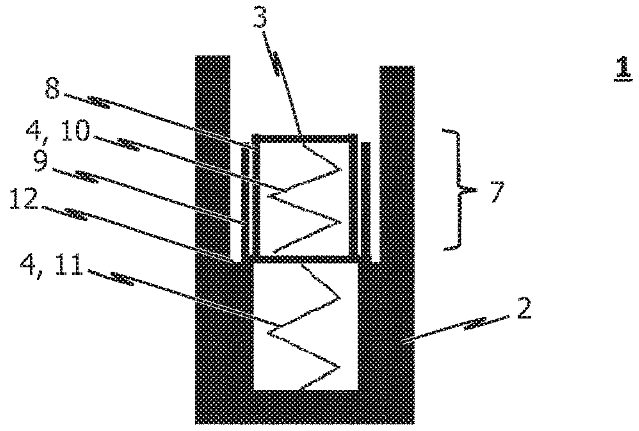
FIG. 6 schematically and in a cut view, the second exemplary embodiment of the actuating apparatus according to the invention according to FIG. 5, but in a state in which the actuating part is in the compressed state for unlocking the actuating part (=third position of the actuating part)

In order to lift the locking/arresting of the actuating part 3 so that the actuating part 3 can then be moved from the first position shown in FIG. 5 into the second position shown in FIG. 7, the actuating part 3 must be moved further into the housing 2, and more specifically into the housing 2, to a third position, as indicated in FIG. 6.

The associated locking and/or arresting kinematics of the actuating apparatus 1 is not shown in FIG. 5 to FIG. 7. This locking and/or arresting kinematic is preferably a locking and/or arresting kinematics as described, for example, in publication DE 10 2018 123 945 A1 or in publication DE 10 2008 057 933 A1.

As indicated in FIG. 5 to FIG. 7, the exemplary embodiment of the actuating apparatus 1 shown therein comprises an elastically deformable spring system 4 associated with the actuating part 3 in order to move the actuating part 3 towards the second position of the actuating part 3 (cf. FIG. 7), respectively.

Specifically, the elastically deformable spring system 4 is configured in order to bias the actuating part 3 with a first (relatively low) biasing force towards the second position of the actuating part 3 when the actuating part 3 is located between the first and second positions and to bias the actuating part 3 with a second (relatively high) biasing force towards the second position of the actuating part 3 when the actuating part 3 is located between the second and third positions.

In the embodiment shown in FIG. 5 to FIG. 7, a damper or spring device 7, which is in particular encapsulated at least in regions, is used to implement the biasing mechanism.

In the embodiment shown in FIG. 5 to FIG. 7, this damper or spring mechanism 7 is embodied as a cylinder-piston arrangement and comprises a first force transfer element 8 facing toward the second position of the actuating part 3 and a second force transfer element 9, which is axially spaced apart therefrom. It is provided that a spring element 10 is arranged between the first and second force transfer elements 8, 9 in order to bias the first force transfer element 8 towards the second force transfer element 9 in such a way that the first force transfer element 8 is only movable relative to and towards the second force transfer element 9 by overcoming the biasing force of the spring element 10.

In addition, in the embodiment shown in FIG. 5 to FIG. 7, an (additional) spring system 11 associated with the elastically deformable spring system 4 is used in order to axially bias the damper or spring device 7 towards the second position of the actuating part 3 (cf. FIG. 7). In this case, the damper or spring device 7 can be moved axially at least in regions relative to the housing 2.

Specifically, it is provided in this context that the actuating part 3 of the actuating apparatus 1 is in particular formed by the first force transfer element of the damper or spring device 7.

As shown in FIG. 5 to FIG. 7, in this embodiment, there is further provided a stop 12, which is preferably formed in the housing 2. The stop 12 is configured in order to limit a stroke of movement of the damper or spring device 7 into the housing 2.

In particular, the stop 12 is configured in order to block a movement of the second force transfer element of the damper or spring device 7 further into the housing 2 when the first force transfer element 8, which assumes the function as the actuating part 3, is present in its first position (cf. FIG. 5). When the actuating part 3 is then pushed further into the housing 2 in order to unlock the locking and/or arresting kinematics or to unlock the actuating part 3, the biasing force exerted by the spring element 10 arranged in the damper or spring device 7 must be overcome.

The biasing force or spring stiffness of the spring element 10 of the damper or spring device 7 is preferably greater than the spring stiffness of the spring system 11 of the elastically deformable spring system 4.

Figure 8:
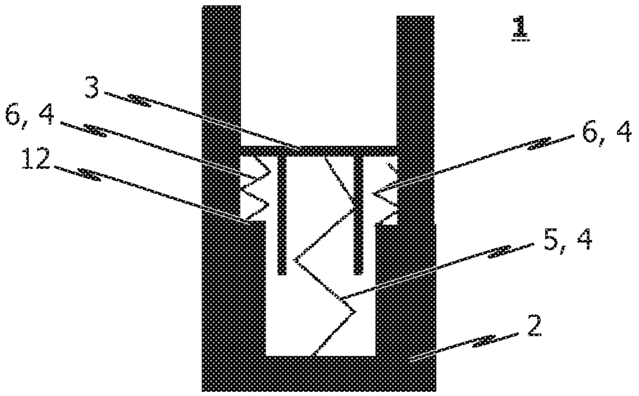
FIG. 8 schematically and in a cut view, a third exemplary embodiment of the actuating apparatus according to the invention, wherein the actuating part is in the closed and locked/arrested position (=first position of the actuating part)
Figure 9:
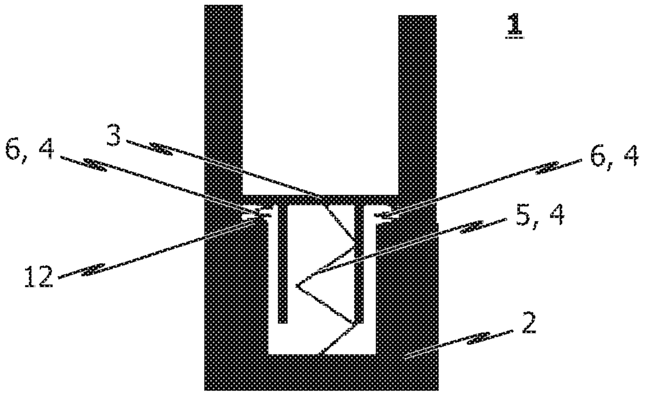
FIG. 9 schematically and in a cut view, the third exemplary embodiment of the actuating apparatus according to the invention according to FIG. 8, however, in a state in which the actuating part is in the compressed state for unlocking the actuating part (=third position of the actuating part)
Figure 10:
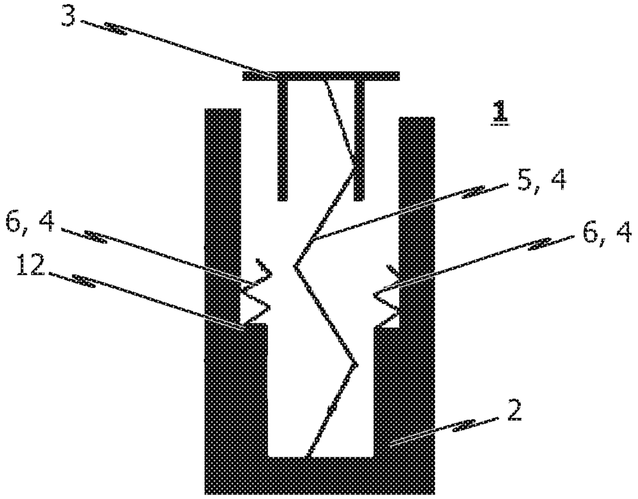
FIG. 10 schematically and in a cut view, the third exemplary embodiment of the actuating apparatus according to the invention, but in a state in which the actuating part is in the open state (=second position of the actuating part).

Referring now to FIGS. 8-10, a further embodiment of the actuating apparatus 1 according to the invention will be described.

In structural terms, this embodiment substantially corresponds to the embodiment described previously with reference to the drawings in FIG. 5 to FIG. 7, although a different configuration for a mixing circuit of single springs 5, 6 is now employed.

Specifically, in the embodiment of the actuating apparatus 1 according to the invention shown in FIG. 8 to FIG. 10, it is provided that the elastically deformable spring system 4 comprises a first spring system 5 having at least a first spring element and a second spring system 6 having at least a second spring element.

The first spring system 5 is formed with the at least one first spring element and is configured in order to bias the actuating part 3 of the actuating apparatus 1 with a biasing force towards the second position of the actuating part 3 (cf. FIG. 10) when the actuating part 3 is located between the first and second positions or when the actuating part 3 is located between the second and third positions.

By contrast, the second spring system 6 is formed with the at least one second spring element and configured in order to bias the actuating part 3 with a biasing force towards the second position of the actuating part 3 only when the actuating part 3 is located between the second and third positions, and, in particular, to not bias the actuating part 3 towards the second position of the actuating part 3 when the actuating part 3 is located between the first and second positions.

In the further embodiment of the actuating apparatus 1 according to the invention as shown in FIG. 8 to FIG. 10, the second spring system 6 is formed with the at least one second spring and is received or integrated in the housing 2 in such a way that the at least one second spring of the second spring system 6 is only compressed with the actuating part 3 or by the actuating part 3 or is compressible when the actuating part 3 is located in its first position or between the first and third positions.

However, instead of a second spring system 6, which is received or integrated in the housing 2, it is also conceivable that the second spring system comprises as the second spring element a spring-elastic component and in particular a component made of a spring-elastic elastomer, which is preferably arranged outside the housing 2 and configured in order to come into contact with the cover only when the actuating part 3 is located in its first position or between the first and third positions.

The invention is not limited to the embodiments shown in the drawings, but rather results when all of the features disclosed herein are considered together.

LIST OF REFERENCE NUMERALS

1 Actuating apparatus
2 Housing
3 Actuating part
4 Elastically deformable spring system
5 First spring system
6 Second spring system
7 Damper or spring device
8 First force transfer element
9 Second force transfer element
10 Spring element of the damper or spring device
11 Spring system
12 Stop
13 Actuator
14 Blocking recess
15 Blocking latch

The invention claimed is:

1. Actuating apparatus for opening and closing a cover in or on a vehicle, with a locking and/or arresting kinematics that cooperates with the cover, wherein the actuating apparatus comprises:

a housing, which is suitable to be installed in a vehicle;

an actuating part, which is received at least in regions in the housing and supported axially relative to the housing, wherein the actuating part cooperates with the cover and is connected or connectable to the cover in such a way that the actuating part performs a movement relative to the housing between a first position and a second position upon a movement of the cover between a closed position and an open position, wherein, in the first position, the actuating part is in a locked or arrested state; and an elastically deformable spring system associated with the actuating part for biasing of the actuating part towards the second position of the actuating part, wherein the locking and/or arresting kinematics is configured in such a way that a lifting of the locking or arresting is initiated and/or that the locking or arresting of the actuating part is lifted or liftable when, starting from the first position of the actuating part, the actuating part is moved further into the housing to a third position relative to the housing, wherein the spring system is configured in order to bias the actuating part with a first biasing force or a first biasing force range towards the second position of the actuating part when the actuating part is located between the first and second positions and to bias the actuating part with a second biasing force or with a second biasing force range towards the second position of the actuating part when the actuating part is located between the first and third positions, wherein the first biasing force or the first biasing force range is different from the second biasing force or the second biasing force range;

wherein the actuating apparatus comprises a damper or spring device, which encapsulates a spring element of the spring system, wherein the damper or spring device is axially movable relative to the housing and comprises a first force transfer element facing towards the second position of the actuating part and a second force transfer element axially spaced apart therefrom, wherein the first force transfer element is movable while overcoming a biasing force relative to and towards the second force transfer element, wherein the spring system axially biases the damper or spring device towards the second position of the actuating part.

2. The actuating apparatus according to claim 1, wherein the first biasing force or the first biasing force range and/or the second biasing force or the second biasing force range is/are pre-determinable.

3. The actuating apparatus according to claim 1, wherein the spring system comprises a spring characteristic in such a way that, upon an increase in a compression of the biasing system, the biasing force acting on the actuating part increases.

4. The actuating apparatus according to claim 1, wherein the spring element is a spring with a conical or barrel-shaped design.

5. The actuating apparatus according to claim 1, wherein the spring system comprises a mixing circuit formed by the spring element and at least one further spring element connected in series.

6. The actuating apparatus according to claim 1, wherein the actuating part is formed by the first force transfer element of the damper or spring device, and wherein a stop is provided, which is formed in the housing, wherein the stop is configured in order to limit a stroke of motion of the second force transfer element of the damper or spring device into the housing, wherein the stop is configured in order to block a movement of the second force transfer element of the damper or spring device further into the housing when the actuating part is in its first position.

7. The actuating apparatus according to claim 1, wherein a spring stiffness of the damper or spring device is stronger than a spring stiffness of the spring system of the biasing system.

8. The actuating apparatus according to claim 1, wherein the actuating apparatus further comprises an electromotive actuator for moving the cover between the closed position and the open position after unlocking of the actuating part.

9. Actuating apparatus for opening and closing a cover in or on a vehicle, with a locking and/or arresting kinematics that cooperates with the cover, wherein the actuating apparatus comprises:

a housing, which is suitable to be installed in a vehicle;

an actuating part, which is received at least in regions in the housing and supported axially relative to the housing, wherein the actuating part cooperates with the cover and is connected or connectable to the cover in such a way that the actuating part performs a movement relative to the housing between a first position and a second position upon a movement of the cover between a closed position and an open position, wherein, in the first position, the actuating part is in a locked or arrested state; and an elastically deformable spring system associated with the actuating part for biasing of the actuating part towards the second position of the actuating part, wherein the locking and/or arresting kinematics is configured in such a way that a lifting of the locking or arresting is initiated and/or that the locking or arresting of the actuating part is lifted or liftable when, starting from the first position of the actuating part, the actuating part is moved further into the housing to a third position relative to the housing, wherein the spring system is configured in order to bias the actuating part with a first biasing force or a first biasing force range towards the second position of the actuating part when the actuating part is located between the first and second positions and to bias the actuating part with a second biasing force or with a second biasing force range towards the second position of the actuating part when the actuating part is located between the first and third positions, wherein the first biasing force or the first biasing force range is different from the second biasing force or the second biasing force range;

wherein the actuating apparatus comprises a damper or spring device, wherein the damper or spring device is axially movable relative to the housing and comprises a first force transfer element facing towards the second position of the actuating part and a second force transfer element axially spaced apart therefrom, wherein the spring system is configured such that an internal spring force is provided between the first force transfer element and the second force transfer element, wherein the first force transfer element is movable while overcoming a biasing force relative to and towards the second force transfer element, wherein the spring system axially biases the damper or spring device towards the second position of the actuating part.

* * * * *